US009560568B2

United States Patent
Tipton et al.

(10) Patent No.: US 9,560,568 B2
(45) Date of Patent: *Jan. 31, 2017

(54) DYNAMIC STEERING OF TRAFFIC ACROSS RADIO ACCESS NETWORKS

(71) Applicants: AT&T Mobility II LLC, Atlanta, GA (US); AT&T INTELLECTUAL PROPERTY I, L.P., Atlanta, GA (US)

(72) Inventors: Rick Tipton, Corryton, TN (US); Mark Austin, Roswell, GA (US); Zhi Cui, Sugar Hill, GA (US); Alain Ohana, Aventura, FL (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/477,814

(22) Filed: Sep. 4, 2014

(65) Prior Publication Data

US 2014/0376365 A1    Dec. 25, 2014

Related U.S. Application Data

(63) Continuation of application No. 13/709,284, filed on Dec. 10, 2012, now Pat. No. 8,855,625.

(51) Int. Cl.
*H04W 36/30*    (2009.01)
*H04W 36/26*    (2009.01)
(Continued)

(52) U.S. Cl.
CPC .......... *H04W 36/22* (2013.01); *H04L 12/5692* (2013.01); *H04L 41/0816* (2013.01);
(Continued)

(58) Field of Classification Search
CPC .... H04W 24/02; H04W 36/22; H04W 36/245; H04W 36/26; H04W 36/30; H04W 28/08; H04L 12/5692; H04L 41/0816; H04L 41/0893
See application file for complete search history.

(56) References Cited

U.S. PATENT DOCUMENTS

2009/0196268 A1    8/2009    Caldwell et al.
2011/0075608 A1*   3/2011    Chai ................... H04W 48/18
                                                        370/328
(Continued)

FOREIGN PATENT DOCUMENTS

WO    2011082833    7/2011

OTHER PUBLICATIONS

Interdigital. "Smart Access Manager," published online at http://www.interdigital.com/smart-access-manager, retrieved on Apr. 3, 2013, 3 pages.

(Continued)

*Primary Examiner* — Brian D Nguyen
(74) *Attorney, Agent, or Firm* — Amin, Turocy & Watson, LLP

(57) ABSTRACT

Intelligent radio access technology sensing and selection are applied in a dynamic traffic steering network. Network characteristics and network policies are determined. A server sends network characteristics and network policies to user equipment devices. User equipment devices can determine a radio access technology to connect to based on network policies and network characteristics. Further, it can be determined how to select user equipment devices for connection to a radio access network via a radio access technology. User equipment devices can dynamically select a radio access network for connection based on real-time or near real-time radio access network conditions. A self-organizing network can monitor and determine radio access (Continued)

network conditions and the radio access network conditions can be sent to user equipment devices in given cellular broadcast area.

20 Claims, 11 Drawing Sheets

(51) Int. Cl.
| | |
|---|---|
| H04W 36/22 | (2009.01) |
| H04W 28/08 | (2009.01) |
| H04L 12/54 | (2013.01) |
| H04W 36/24 | (2009.01) |
| H04L 12/24 | (2006.01) |
| H04W 24/02 | (2009.01) |

(52) U.S. Cl.
CPC ......... *H04L 41/0893* (2013.01); *H04W 24/02* (2013.01); *H04W 28/08* (2013.01); *H04W 36/245* (2013.01); *H04W 36/26* (2013.01); *H04W 36/30* (2013.01)

(56) References Cited

U.S. PATENT DOCUMENTS

| | | | |
|---|---|---|---|
| 2011/0110300 A1 | 5/2011 | Sachs et al. | |
| 2012/0309447 A1* | 12/2012 | Mustajarvi | H04W 48/18 455/524 |
| 2013/0034019 A1* | 2/2013 | Mustajarvi | H04W 48/16 370/254 |
| 2013/0041981 A1* | 2/2013 | Kim | H04W 48/16 709/217 |
| 2013/0064221 A1* | 3/2013 | Pampu | H04W 36/0033 370/331 |
| 2013/0294284 A1* | 11/2013 | Popa | H04L 63/065 370/254 |
| 2014/0023059 A1* | 1/2014 | Gupta | H04W 36/34 370/338 |

OTHER PUBLICATIONS

Guo, et al. "A Seamless and Proactive End-to-End Mobility Solution for Roaming Across Heterogeneous Wireless Netowrks" IEEE Journal on Selected Areas in Communications, vol. 22, No. 5, Jun. 2004, 15 pages.

Non-Final Office Action for U.S. Appl. No. 13/709,284 dated Jan. 30, 2014. 15 pages.

Notice of Allowance for U.S. Appl. No. 13/709,284 dated Jun. 5, 2014. 13 pages.

* cited by examiner

DYNAMIC STEERING OF TRAFFIC ACROSS RADIO ACCESS NETWORKS

CROSS-REFERENCE TO RELATED APPLICATIONS

This continuation application claims the benefit of priority to U.S. patent application Ser. No. 13/709,284, filed Dec. 10, 2012, and entitled "DYNAMIC STEERING OF TRAFFIC ACROSS RADIO ACCESS NETWORKS," issued as U.S. Pat. No. 8,855,625, the entirety of which is incorporated herein by reference.

TECHNICAL FIELD

The subject disclosure relates to wireless communications, for example, to intelligent network traffic steering based on dynamic network condition(s).

BACKGROUND

Wireless service providers are observing an exponential growth in mobile communications due to both an increase in consumer demand and commercial requirements. To ensure customer satisfaction, wireless service providers aim to deliver a high quality service at any location, to facilitate reliable and efficient mobile communications. Consumers can access a growing number of networks using a mobile device. These networks include, for example, 3G networks, 4G networks, long term evolution networks and Wi-Fi networks. These networks allow consumers to communicate voice, text, multimedia, and other data to and from other network entities, such as servers and other mobile devices.

The number of consumers accessing these networks and the amount of bandwidth used by consumers are rapidly increasing. With this rapid increase, mobile traffic is also increasing along the networks placing strain on networks and network resources. The strain can result in a bottleneck restricting data flow, such as at a cellular base station. When networks are strained, consumers can experience a diminished quality of service and become frustrated.

BRIEF DESCRIPTION OF THE DRAWINGS

Various embodiments will be apparent upon consideration of the following detailed description, taken in conjunction with the accompanying drawings, in which like reference characters refer to like parts throughout, and in which.

DETAILED DESCRIPTION

Figure 1:
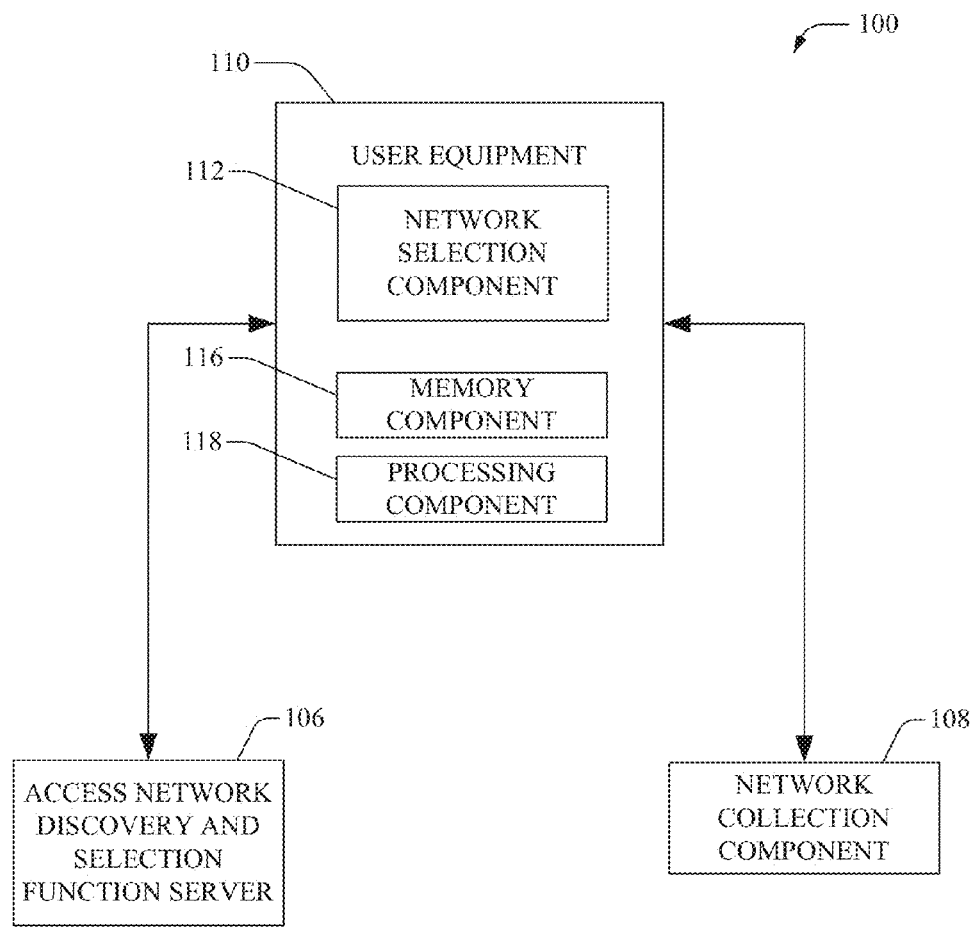
FIG. 1 illustrates an example system that can dynamically steer network traffic based on network conditions.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms "access point," "server," "base server," and the like, are utilized interchangeably in the subject application, and refer to a network component or appliance that serves and receives data, control, voice, video, sound, gaming, or substantially any data-stream or signaling-stream from a set of subscriber stations. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

It is noted that, terms "user equipment," "device," "user equipment device," "client," and the like are utilized interchangeably in the subject application, unless context warrants particular distinction(s) among the terms. Such terms can refer to network component(s) or appliance(s) that servers and receives data, voice, video, sound, games, or substantially any data-stream or signaling-stream to or from network components and/or other devices. By way of example, a user equipment device and the like, as used herein and throughout this disclosure, can comprise a mobile device such as an electronic device capable of wirelessly sending and receiving data. A user equipment device may have a processor, a memory, a transceiver, an input, and an output. Examples of such devices include cellular telephones, personal digital assistants, portable computers, tablet computers, hand held gaming counsels, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Furthermore, the terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously in the same time (or near the same time) it takes to input and output the same set of samples independent of any processing delay.

Aspects or features of the subject specification can be exploited in substantially any radio access network employing respective radio access technologies, e.g., Wi-Fi, global system for mobile communications, universal mobile telecommunications system, worldwide interoperability for microwave access, enhanced general packet radio service, third generation partnership project long term evolution, fourth generation long term evolution, third generation partnership project 2, ultra mobile broadband, high speed packet access, Zigbee, $x^{th}$ generation, long term evolution, or another IEEE 802.XX technology. Additionally, substantially all aspects of the subject specification can be exploited in legacy telecommunication technologies.

The systems and methods disclosed herein, in one aspect thereof, can steer user traffic along a number of networks via static and/or dynamic network selection policies. A centralized self-organizing network for radio access technologies can detect information (e.g., network performance and other metrics) associated with communication networks. A cellular broadcast channel, Wi-Fi channel and the like can send information to a user device to enable intelligent selection of a radio technology (e.g., universal mobile telecommunications system, long term evolution, Wi-Fi, etc.) for delivering and receiving communications of a user device. In another example, a user device can apply a policy based on one or more parameters, such as user subscription profile, a device state, and network states to select a radio technology for communication.

Another aspect of the disclosed subject matter relates to real time or near-real time load collection and processing for radio access networks. In particular, multiple cellular channels, Wi-Fi channels and other radio channels can be monitored and characteristics of the channels can be determined in real time or near-real time. A network management device (e.g., within a centralized self-organizing network) can communicate the characteristics to a communication device (e.g., a mobile phone). The communication device can utilize the characteristics as well as network selection policies dynamically to select a radio access network to utilize for communication.

In various embodiments, user equipment devices can receive network selection policy information and network statistic information (e.g., load information). A user equipment device can dynamically select, based on policy information and network statistic information, a particular network to transmit or receive data. In one aspect, a server device (e.g., an access network discovery and selection function server) can collect information pertaining to a user equipment device and processes the information to generate a network selection policy. The server can then "push" or upload the policy to a user equipment device. The network selection policy can include logic to instruct a user equipment device to select a network based on network statistics (e.g., network conditions, load conditions, etc.).

In another embodiment, a network statistic collection agent, (e.g., a centralized self-organizing network system) can gather information pertaining to radio access networks. The information can include network characteristics and performance metrics (e.g., bandwidth utilization, load, etc.). The information can be processed to generate a composite load information. The composite load information can be aggregated into transmittable data (e.g., packet). The transmittable data can be pushed to a user equipment device. In one example, a network statistic collection agent monitors multiple networks and repeatedly pushes updated network statistic information to a user equipment device. The repeated pushing of update data can enable real-time or near real-time awareness of network conditions by a user equipment device.

In one aspect, a user equipment device can select a radio access network based on real-time or near real-time network conditions in combination with a customized and intelligent network selection policy. The selection of a radio access network based on real-time or near real-time network conditions can offset load across a network, enhance user experience, increase available bandwidth, decrease cost associated with cellular services to a service provider and/or consumers, improve power consumption metrics on a user equipment device and network service devices, and the like.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLU-ETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice and/or data traffic) between one or more components can include, wired communications (routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like).

A network typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

Referring initially to FIG. 1, illustrated is an example system 100 that can increase system capacity, improve user experience, and/or balance network traffic based on user traffic steering according to an aspect of the subject specification. System 100 can include a network collection component 108, an access network discovery and selection function server 106, and a user equipment device 110. In one aspect, user equipment device 110 can include a memory 116, for storing computer executable components such as a network selection component 112, and a processor 118 that can facilitate operation of the computer executable components.

The system 100 utilizes measurement(s) processed by the network collection component 108 to determine network characteristics (e.g., load over a network, available bandwidth, etc.). Further, network collection component 108 can utilize the network characteristics to steer user equipment device traffic. In one aspect, user equipment device 110 can receive data from the access network discovery and selection function server 106 and the network collection component 108 to facilitate selection of a radio access network.

According to an embodiment, access network discovery and selection function server 106 can collect information pertaining to components comprising a communication network (e.g., a macro network). In one aspect, access network discovery and selection function server 106 can receive information regarding a policy rule(s) (e.g., a user defined rule(s)), a user profile(s) via a user subscription, a device type associated with user equipment device 110, and the like. In another aspect, access network discovery and selection function server 106 can create and determine traffic steering rules based on received information. Further, access network discovery and selection function server 106 can create the traffic steering rules for individual user equipment devices or groups of user equipment devices. In various embodiments, access network discovery and selection function server 106 can create group traffic steering rules for groups of user equipment devices based on received information (e.g., subscription profiles, quality of service agreements, user equipment device type, etc.).

Additionally or alternatively, access network discovery and selection function server 106 can utilize network security techniques to securely communicate with a selected group of user equipment devices. For example, access network discovery and selection function server 106 can authenticate select user equipment devices to allow only user equipment devices serviced by a particular service provider to communicate with access network discovery and selection function server 106. It is noted that access network discovery and selection function server 106 can utilize secure channels, encoded channels, encrypted channels, and the like.

In one embodiment, a traffic steering rule can include instructions to guide user equipment device 110 in connection with radio access network selection. For example, a traffic steering rule can include instructions for radio access network selection based on network load conditions, mobility states, user equipment device 110 hardware and performance metrics, and the like.

It is noted that access network discovery and selection function server 106 can create a traffic steering rule when a new subscription is created, a subscription is altered, a changing location of a user equipment device, and the like. As such, access network discovery and selection function server 106 can create traffic steering rules and store traffic steering rules in a library for future use. Further, it is noted that access network discovery and selection function server 106 is used in an exemplary component and system 100 can utilizes various servers, components, and articles of manufacture to perform the same or substantially the same functions as access network discovery and selection function server 106.

In another embodiment, access network discovery and selection function server 106 can communicate traffic steering policies to user equipment device 110, for example. In one aspect, access network discovery and selection function server 106 can assist user equipment device 110 in discovery of non-third generation partnership project access networks (e.g., Wi-Fi or worldwide interoperability for microwave access). In another aspect, access network discovery and selection function server 106 selects appropriate traffic steering policies for user equipment device 110 and issues the policies. In one aspect, access network discovery and selection function server 106 selects the traffic steering rule based on a user subscription, a user account, or other classification associated with user equipment device 110. In another aspect, access network discovery and selection function server 106 communicates the appropriate traffic steering policy over a communication framework. In one aspect, access network discovery and selection function server 106 can communicated directly with user equipment device 110 via a server to client connection (e.g., standard S14 interface). However, it is noted that access network discovery and selection function server 106 can communicate with user equipment device 110 via an indirect connection, a cellular broadcast, and the like.

In one embodiment, system 100 utilizes network collection component 108 to collect and process network load conditions. In one example, network collection component 108 can represent a centralized self-organizing network for radio access network load collection and processing and the like. In one aspect, network collection component 108 can collect and process network conditions in real-time or near real-time.

In another embodiment, network collection component 108 can collect network statistic information. For example, network collection component 108 can collect radio access network load information from an OSS. Network statistic information can include network load data, bandwidth utilization of a network (e.g., 3G, 4G, long term evolution, and the like), peak usage times, available bandwidth of a network, a number of requests to network resources, and other metrics.

In one embodiment, a network collection component 108 process collects information. In an aspect, processing can comprise aggregating network information for available networks into a composite network indication. In another aspect, processing can comprise communicating collecting information to various components of system 100, such as to access network discovery and selection function server 106. Network collection component 108 can communicate information, e.g., via cellular broadcast service, Wi-Fi 802.11, or other communication methods.

In an embodiment, user equipment device 110 can employ network selection component 112 to determine a select radio access network to access. In system 100, user equipment device 110 can determine what radio access network(s) to access, which can allow for congestion-based traffic steering between cellular, Wi-Fi, and Wi-Fi alternative radio access networks, can alter a quality of experience for a user, efficiently balance network load between various radio access networks, dynamically modify radio access network selection policies with changing network conditions, increase bandwidth a network or group of networks can support, and control unauthorized roaming on third party access points. In another aspect, offloading traffic from one radio access network can reduce operational and transport costs for a service provider since a lesser number of users consumes radio access network over-the-air radio resources (e.g., radio traffic channels), which are typically limited. With the rapid increase in utilization of communications networks and/or devices, mobile data communications have been continually evolving due to increasing requirements of workforce mobility, and, services provided, thus employing system 100 can lead to overall service enhancement.

In another embodiment, user equipment device 110 can receive data from various components of system 100. In one aspect, user equipment device 110 can receive data from network information from network collection component 108 (e.g., via cellular broadcast servers, Wi-Fi and the like). In another aspect, user equipment device 110 can receive network traffic steering rules from access network discovery and selection function server 106. Network selection component 112 can initiate a radio access network selection procedure network based on user input, data received from access network discovery and selection function server 106, and/or network collection component 108. As an example, the radio access network selection procedure can be performed periodically, at a predefined time, when a condition is met (e.g., a connection times out, a connection bandwidth falls below a level), dynamically and/or on-demand (e.g., requested by core network).

In one example, network selection component 112 can utilize measurements and/or policies to identify an ideal radio access network to access to enhance a performance metric. In various embodiments, network selection component 112 can select a radio access network to increase data processing speed (on the client or server side), reduce load on a particular radio access network, alter power consumption (e.g., increase battery life of user equipment device 110), meet a quality of service related to a user subscription, device-to-access network discovery and selection function server requirements, and the like.

Figure 2:
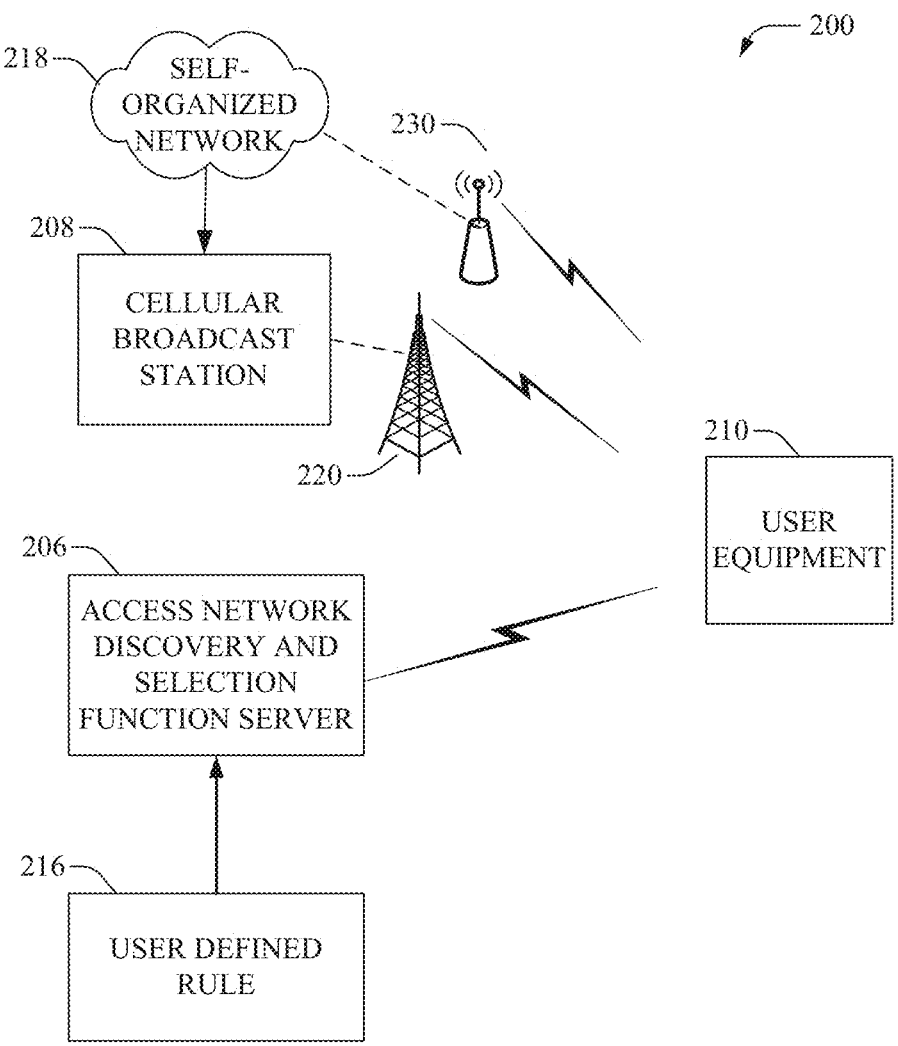
FIG. 2 illustrates an example system for real-time network traffic steering that can increase a perceived quality of experience via a static network selection policy.

Referring now to FIG. 2, illustrated is an example system 200 for dynamic network selection based on real-time or near real-time network traffic in accordance with an exemplary embodiment of this disclosure. The system 200 can include a user equipment device 210 within range of a number of radio access networks (e.g., various cellular networks, Wi-Fi networks, and the like). A self-organizing network 218 can monitor various radio access networks and communicate data to a cellular broadcast server 208, user equipment device 210, and various other components of system 200.

In one embodiment, self-organizing network 218 can be a centralized self-organizing network capable of self-configuration, self-optimization, and self-healing. Self-configuration can comprise all capabilities necessary to automate deployment and commissioning of networks and configuration parameters. Networks can operate autonomously, running routines, authenticating and connection to an open systems, as well as communication information with other networks. Self-optimization can comprise the ability to improve or recoup network quality by tuning network parameters based on network conditions. In one aspect, self-optimization can include brokering handovers of cellular clients and balancing load among network components (e.g., base stations, micro access points, macro access points, femto cells, Wi-Fi access points, and the like). In another aspect, self-healing can refer to functions designed to cope with network failures (e.g., power/service outage). This can comprise re-organization of access point coverage areas to cover areas of no or weak service. In another aspect, self-organizing network 218 can comprise multiple networks and network components, such as Wi-Fi access points, Wi-Fi networks, cellular access points, cellular networks, satellite networks, and the like.

Self-organizing network 218 can employ various radio access networks to collect network load information, process load indication, and/or calculate a composite load indication. For example, self-organizing network 218 can employ multiple cellular radio access networks, each cellular radio access network can collect load information pertaining to it or neighboring radio access networks. Additionally and/or alternatively, cellular radio access networks can process load information and determine a composite load indication. A composite load indication can comprise a congestion token. For example, congestion tokens can include a set of indicators indicated various levels of load (e.g., RED, YELLOW, GREEN, and/or a numerical scale), a congestion percentage (e.g., based on total available bandwidth, used bandwidth, or capable bandwidth verses used bandwidth), and the like.

In another embodiment, self-organizing network 218 can determine statistical information associated with networks comprised by self-organizing network 218, networks not comprised by self-organizing network 218, and/or a set of select number of networks. For example, self-organizing network 218 can determine statistical information for each network comprised by self-organizing network 218 (e.g., 3G, 4G, long term evolution, Wi-Fi, etc.). This information can be aggregated into a report or data packet and sent to user equipment device 210. However, in another example, self-organizing network 218 may not have access to information regarding some networks (e.g., private Wi-Fi networks, cellular networks of other service providers, etc.). In this case, self-organizing network 218 can communicate with components not comprised by self-organizing network 218 to determine statistical information associated with those networks not comprised by self-organizing network 218. In an additional and/or alternative embodiment, self-organizing network 218 can determine a set of networks for determining of statistical information. For example, self-organizing network 218 can communicate with a network component, (user equipment device 210 or an access network discovery and selection function server 216, for example), to determine if user equipment device 210 can connect to a given radio access network. If user equipment device 210 cannot connect to a given radio access network then self-organizing network 218 may forgo determining statistical information for the given radio access network. It is noted that self-organizing network 218 can lack ability to connect to a particular radio access network due to a location outside a coverage area of a radio access network (e.g., as determined by global positioning service (GPS)), lack of a particular radio access network support (e.g., user equipment device 218 does not comprise a fourth generation capable radio), user agreement (e.g., user equipment device 218 is associated with a service agreement which does not provide for a particular radio access network), and/or other various conditions.

Additionally or alternatively, self-organizing network 218 can collect statistical information related to hotspots (e.g., coverage area of a Wi-Fi access point 230). In one aspect, statistical information can comprise network load data, bandwidth utilization, composite load token indicators, and the like. Self-organizing network 218 can communicate with Wi-Fi access point 230 via IEEE 802.11e/k/v, hotspot 2.0, or alternative protocols. It is noted that self-organizing network 218 can collect statistical information from Wi-Fi access point 230 prior to, during, and/or after user equipment device 210 associates (connects) with Wi-Fi access point 230. In another aspect, self-organizing network 218 can collect positioning information to determine user equipment device 210's location and proximity to Wi-Fi access point 230.

Self-organizing network 218 can send and/or receive data via a cellular broadcast server 208 that can send a cellular broadcast (CB) to user equipment device 210. In one aspect, cellular broadcast server 208 can utilize a cellular access point 220 to connect to user equipment device 210. Cellular access point 220 can comprise one or more macro access points, micro access points, femto access points, and other access point capable of relaying a CB. In another aspect, self-organizing network 218 can communicate statistical information to user equipment device 210 via Wi-Fi access point 230. It is noted that self-organizing network 218 can utilize SIB or other alternative communication frameworks to communicate with user equipment device 210 and various other network components.

Access network discovery and selection function server 206 can determine network selection policies for user equipment devices. In one aspect, access network discovery and selection function server 206 creates network selection policies tailored to specific user equipment devices (or groups of user equipment devices) based on data related to specific user equipment devices or sets of user equipment devices. For example, access network discovery and selection function server 206 can create a policy based on a type of user equipment device, user equipment device location, and/or a service agreement associated with a user equipment device (e.g., standard, premium, etc.). Additionally or alternatively, access network discovery and selection function server 206 can collect user-defined rules (user defined rules) 216 provided by user equipment device 210 or other means. User defined rule 216 can comprise customized settings based on a user's preference. For example, a user can enter preferences defining user defined rule 216 via an interface of user equipment device 210 and access network discovery and selection function server 206 can collect user defined rule 216.

User equipment device 210 can communicate a device type, data associated with a service agreement, and other information pertaining to user equipment device 210 to access network discovery and selection function server 206 via an IP interface, extensional MO over standard S14 interface, published MOs, and other viable interfaces. It is noted that access network discovery and selection function server 206 can include a library of user equipment device specific policy rules, further access network discovery and selection function server 206 can collect data related to specific user equipment devices via server side clients and other network components.

User equipment device 210 can collect network selection policy data and radio access network statistical data. In one embodiment, user equipment device 210 collects network selection policy data from access network discovery and selection function server 206 and collects radio access network statistical data from self-organizing network 208. user equipment device 210 can process collected data to determine a radio access network to select for communication. In one aspect, user equipment device 210 can base selection on a parameter, such as quality of service, user equipment device battery optimization, network load balancing, and the like. In an aspect, optimization techniques and/or functions can be utilized to optimize a particular parameter. In another aspect, optimization techniques and/or functions can be implemented to balance one or more parameters.

As an example, user equipment device 210 can collect a network selection policy. The network selection policy can comprise logic to steer network traffic. user equipment device 210 can also collect network statistical information indicating network traffic and load among networks in a service area. Typically, 4G networks offer a high quality of service and allow users to experience a higher quality of experience. However, in some cases a 4G network may be overloaded and experience lag or bottle neck. In these cases, user equipment device 210 can determine an alternative network offers a higher quality of experience at a particular time. user equipment device 210 can connect to the alternative network rather than the overloaded network.

Additionally or alternatively, user equipment device 210 can continuously and/or periodically receive network statistical information and monitor a network to determine what network to select based on a policy. For example, user equipment device 210 can connect to a first network and can later determine, based on network statistical information, that a second network is desirable according to a policy (e.g., higher level or quality of experience, desired battery utilization, etc.). In another aspect, user equipment device 210 can receive network statistical information on demand, based on a predefined rule, or upon occurrence of an event. For example, user equipment device 210 can issue a request for network statistical information (e.g., via user input to user equipment device 210). User input can include creation and/or application of a user defined rule, manual request, and the like.

Moreover, user equipment device 210 can seamlessly or near-seamlessly switch from one radio access network to a determined radio access network. For example, user equipment device 210 can perform handovers or other processes to switch from one radio access network (e.g., 4G) to another radio access network (e.g., Wi-Fi). In one aspect, switching radio access networks can include activation and/or deactivation of radio components respective of a determined radio access network to connect to and second radio access network to disconnect from (e.g., transceivers and receivers) such that user equipment device 210 is connected to at least one network at any given time.

In one embodiment, user equipment device 210 can connect to an outside network (e.g., a network that access network discovery and selection function 206 and self-organizing network 218 do not have access to monitor). For example, user equipment device 210 can connect to a private Wi-Fi network not serviced by user equipment device 210's service provider. In one aspect, a service provider controlling outside network can communicate network statistics. In another aspect, user equipment device 210 can determine network statistics and apply the network statistics, along with a network selection policy and received network statistical information, to determine which radio access network to connect. Additionally or alternatively, user equipment device 210 can transmit network statistical data to disparate user equipment devices in location proximity to user equipment device 210 and/or to self-organizing network 218 and/or access network discovery and selection function 206.

Figure 3:
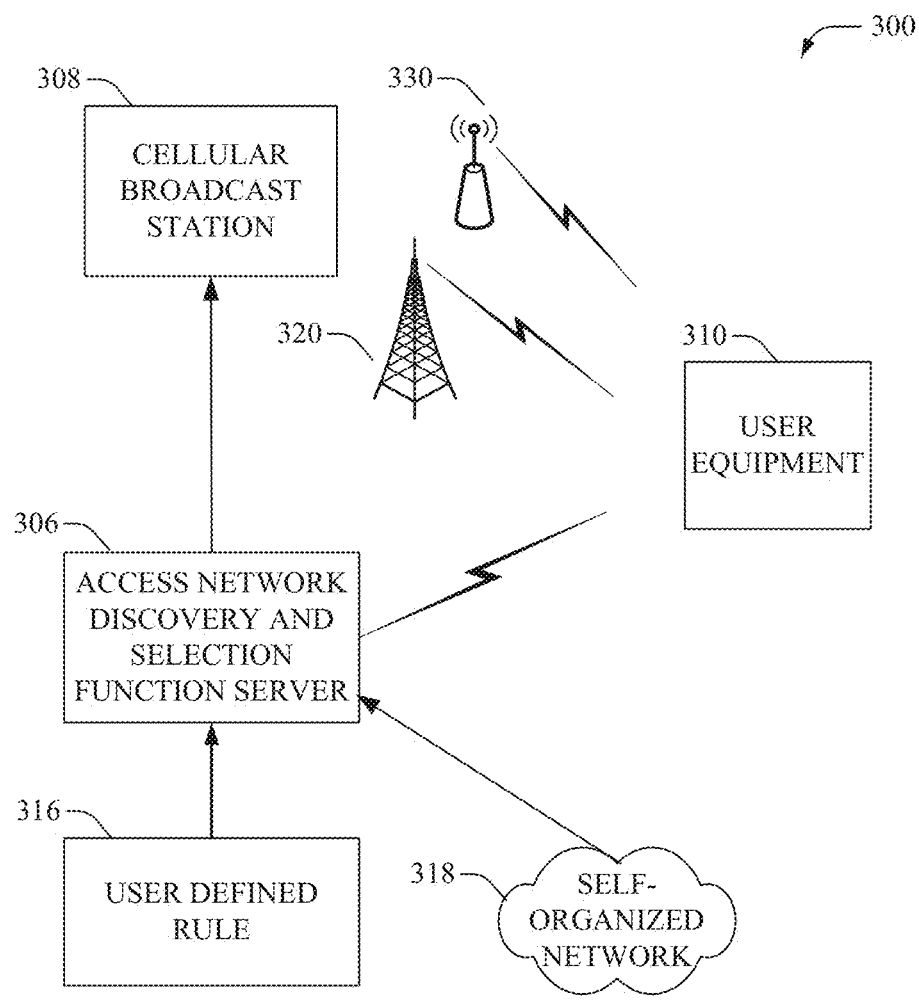
FIG. 3 illustrates an example system for real-time network traffic steering that can increase a perceived quality of experience via a dynamic network selection policy.

Referring now to FIG. 3, illustrated is an example system 300 for dynamic radio access network selection policy creation based on real-time or near real-time network traffic in accordance with an exemplary embodiment of this disclosure. The system 300 can include a user equipment device 310 within range of a number of radio access networks (e.g., various cellular networks, Wi-Fi networks, and the like), a self-organizing network 318, cellular broadcast server 308, access network discovery and selection function server 306, and a user defined rule 316.

Self-organizing network 318 can monitor various radio access networks and determine statistical information relating to the various radio access networks (e.g., performance information, network load information, etc.). In another aspect and in accordance with various aspects of this disclosure, self-organizing network 318 can determine a token indicating an amount of bandwidth utilization (e.g., load) associated with the various radio access networks. In one example, self-organizing network 318 can include cellular base stations, servers, client devices, and the like. In an aspect, one or more cellular broadcast server, server, client devices or other means can collect statistical information and/or determine tokens indicating load of radio access networks.

Access network discovery and selection function server 306 can dynamically determine network selection policies for user equipment devices. Access network discovery and selection function server 306 can collect statistical information relating to radio access networks (e.g., via self-organizing network 318). In one aspect, access network discovery and selection function server 306 can determine a network selection policy, based on the collected statistical information, for user equipment device 310. In another aspect, access network discovery and selection function server 306 can collect user defined rule 316, user equipment device 310 information (e.g., user equipment device type, service agreement information, etc.) and can apply a combination of collected statistical information, user defined rule 316, and user equipment device 310 information to determine a network selection policy.

In an embodiment, access network discovery and selection function server 306 can continuously and/or periodically receive statistical information relating to radio access networks via self-organizing network 318. For example, access network discovery and selection function server 306 can receive statistical information upon occurrence of an event (e.g., a change in a radio access network metric, addition of a radio access network, detection of a new user equipment device, according to UDER 316, upon user request, etc.), at a temporal frequency (e.g., every hour, every i minute, where i is a real number, etc.), and/or according to a predefined rule.

In one aspect, access network discovery and selection function server 306 creates network selection policies tailored to specific user equipment devices (or groups of user equipment devices) based on data related to specific user equipment devices or sets of user equipment devices. For example, access network discovery and selection function server 306 can create a policy based on a type of user equipment device, user equipment device location, and/or a service agreement associated with a user equipment device (e.g., standard, premium, etc.). Additionally or alternatively, access network discovery and selection function server 306 can collect user defined rule 316 provided by user equipment device 310 or other means.

User equipment device 310 can determine a radio access network to connect to, based on network and/or local information and can perform acts to connect to the determined radio access network and disconnect from a previously connected to radio access network. In one aspect, user equipment device 310 can receive network data from access network discovery and selection function server 306 via cellular broadcast server 308, S14 interface, a cellular access point 320, a Wi-Fi access point 330, and/or alternative means. In another aspect, user equipment device 310 can access a network selection policy stored within user equipment device 310 and can apply network statistical information to determine which radio access network to connect to. In one example, user equipment device 310 can determine a radio access network to connect to based on user input. For example, user equipment device 310 can collect user input (e.g., via an interface) and can apply the user input to determine which radio access network to connect to. In one aspect, user input can limit which radio access networks to connect to, can force connection to a particular radio access network, or can alter network selection policies.

In another embodiment, user equipment device 310 can receive an updated network selection policy via access network discovery and selection function server 306. In one aspect, an updated network selection policy can comprise policy rules updated based on real-time or near real-time network conditions. In another aspect, user equipment device 310 can receive updated network selection policies based on user defined rule 316, user input, periodically, continuously, and/or at occurrence of a condition in accordance with various aspects of this disclosure.

Figure 4:
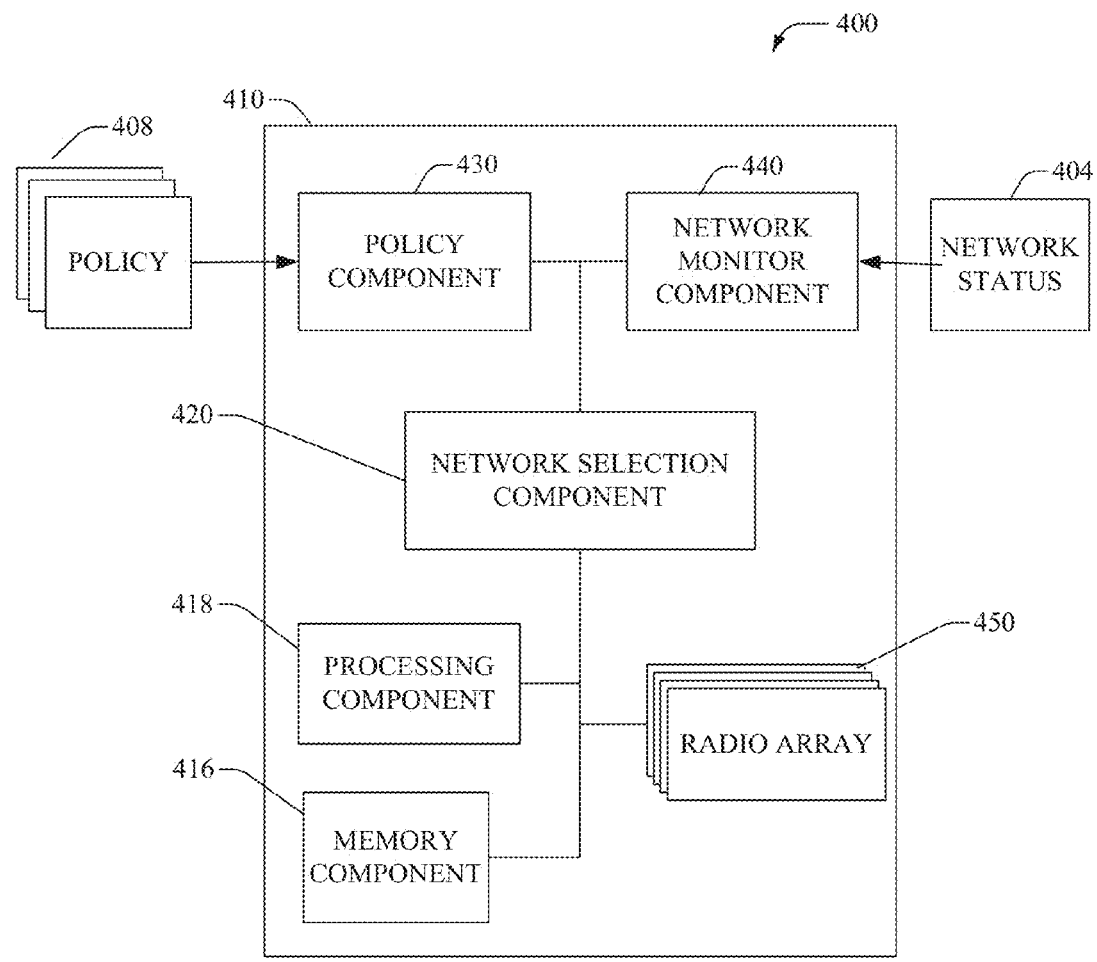
FIG. 4 illustrate an example system that can dynamically select a radio access network to access based on network load.

Referring now to FIG. 4, illustrated is an example system 300 that selects a radio access network based on real-time or near real-time network load information and an intelligent network selection policy. Moreover, system 400 can provide an intelligent approach to dynamically steer network traffic to provide increased user quality of experience, reduced service provider operating costs and expand bandwidth capabilities, based on real-time or near real-time network load measurements and actual network usage data, according to an example embodiment. For example, system 400 can leverage multiple networks and network components to collect load measurements and select a network based on an intelligent network selection policy. Moreover, the system 400 can comprise user equipment device 410 capable of receiving network statistical information 404 and network selection policies 408, in accordance with various aspects of this disclosure. In one aspect, user equipment device 410 can include a memory 416, for storing computer executable components, and a processor 418 that can facilitate operation of the computer executable components. In another aspect, computer executable components can comprise a network selection component 420, a policy component 430, and a network monitor component 440, for example.

According to an embodiment, policy component 430 can receive a network selection policy 408 sent by a network component, such as, but not limited to, servers, user equipment devices, cellular broadcast server, access points, computers, etc. As an example, an access network discovery and selection function server, connected to the user equipment device 410 via a standard S14 interface, can communicate via internet protocol and can send network selection policy 408. It is noted that user equipment device 410 can store a network selection policy 408 in memory 416. Further, network selection policy 408 can be entered via user input, and/or other means.

In accordance with one embodiment of this disclosure, policy component 430 can determine an intelligent network selection policy based on a network policy, data associated with user equipment device 410, and/or user input. In one aspect, policy component 430 can receive network selection policy 408 and alter network selection policy 408 based on user input (e.g., user preferences). For example, policy component 430 can receive network selection policy 408 and alters network selection policy based on user preference to restrict connecting to a given network (e.g., a particular Wi-Fi network).

As another example, policy component 430 can determine information associated with user equipment device 410 (e.g., a device type, a service agreement quality of service, battery level, quality of experience, etc.) and can apply the information to alter network selection policy 408. Additionally and/or alternatively, network selection policy 408 can be based on the information, such that network selection policy 408 is not altered, but rather is utilized to determine a network to select based on the information. Network monitor component 440 can monitor networks based on statistical data. In one aspect, network monitor component 440 can receive network statistics 404 from a network component (e.g., via a self-organizing network, an additional user equipment device). Additionally or alternatively, network monitor component 440 can determine network statistics based on measured data. For example, network monitor component 440 can measure bandwidth of a Wi-Fi network and/or receive data indicative of bandwidth associated with additional radio access networks.

In an embodiment, network monitor component 440 can remember (e.g., store) network statistics for particular radio access networks. For example, network monitor component 440 can store measured or received network statistics in a network library. In an aspect, remembered network statistics can be stored in a memory component, such as memory 416. System 400 can access stored or remembered network statistics to determine a radio access network to select for connecting.

Network selection component 420 can be provided with intelligence to determine a network to select based on a network selection policy. In various embodiments, network selection component 420 can access a network selection policy via policy component 430. In another aspect, network selection component 420 can access radio access network statistical information via network monitor component 440, for example. As an example, network selection component 420 can apply a network selection policy as a function of real-time or near real-time radio access network statistical information, information pertaining to user equipment device 410 (e.g., type, compatibility, etc.), and the like.

In an embodiment, network selection component 420 can select a radio from radio array 450 in accordance with a selected radio access network. For example, radio array 450 can comprise a Wi-Fi radio, a fourth generation radio, a third generation radio, etc. In an aspect, radio array 450 can comprise transceivers, receivers, encoders, decoders, and the like. Further, it is noted that radio array 450 can comprise software-defined radios, a cognitive radio as part of a cognitive radio network, smart radios, and alternative means to send/receive data over radio access network networks.

Figure 5:
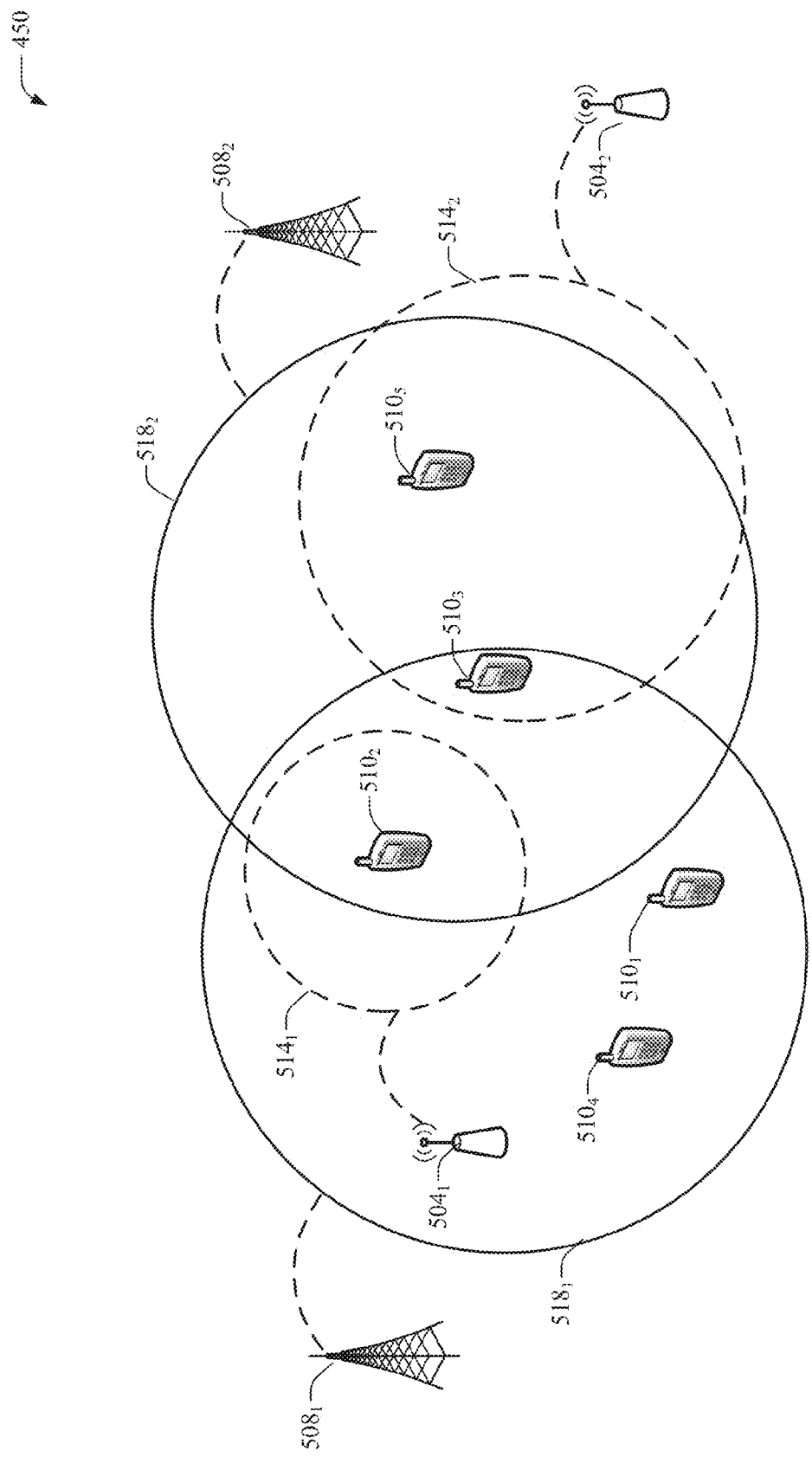
FIG. 5 illustrates an example system that facilitates automating network traffic steering over wireless networks.

Referring now to FIG. 5, illustrated is an example system 500 that steers network traffic in a network based on an intelligent policy and feedback provided on real-time or near real-time network statistics. System 500 includes one or more cellular broadcast server(s) and one or more Wi-Fi access point(s) deployed within a network and servicing one or more user equipment device(s). Although only two Wi-Fi service areas $514_1$-$514_2$, served by their respective access points $504_1$-$504_2$, are illustrated, it is noted that the subject disclosure is not that limited and most any number of Wi-Fi networks can be deployed within the system 500. In addition, although only two cellular service areas $518_1$-$518_2$ areas serviced by their respective cellular broadcast servers $508_1$-$508_2$, are illustrated, most any number of cellular broadcast servers and respective service areas can be deployed within the system 500. Furthermore, although only five user equipment devices $510_1$-$510_5$, are illustrated, most any number of user equipment devices can be deployed within the system 500. Moreover, the access points $504_1$-$504_2$ and cellular broadcast servers $508_1$-$508_2$ can comprise portions of a self-organizing network and can include functionality, as more fully described herein, for example, with regard to systems 100-400. Furthermore, user equipment devices $510_1$-$510_5$ can include functionality, as more fully described herein, for example, with regard to systems 100-400.

In one aspect, access points $504_1$-$504_2$ and cellular broadcast servers $508_1$-$508_2$ can monitor their surrounding radio conditions (e.g., by employing respective measurement components), for example, by performing a network diagnostic procedure, access points $504_1$-$504_2$ and cellular broadcast servers $508_1$-$508_2$ can determine load on a respective network. As an example, during a network listen procedure, the access points $504_1$-$504_2$ and cellular broadcast servers $508_1$-$508_2$ can scan their radio environment to determine network performance statistics. Various parameters associated with access points $504_1$-$504_2$ and cellular broadcast servers $508_1$-$508_2$ can be detected during the network diagnostic procedure, such as, but not limited to, frequency bands, scrambling codes, common channel pilot power, bandwidth across respective networks, universal mobile telecommunications system terrestrial radio access receive signal strength indicator, etc. In one example, these parameters can facilitate determination of network statistics and performance.

In an example scenario, user equipment devices $510_1$-$510_5$ can be serviced by networks via access points $504_1$-$504_2$ and cellular broadcast servers $508_1$-$508_2$. Depending on location, user equipment devices $510_1$-$510_5$ have the option to connect to any number of networks. In one scenario, cellular broadcast server $508_1$ can service user equipment devices $510_1$-$510_4$, which can represent excessive load causing user equipment devices $510_1$-$510_4$ to experience a drop in quality of experience. In an aspect, user equipment devices $510_1$-$510_5$ can connect to any available network based on real-time or near-real time network condition statistics and an intelligent network selection policy. Continuing with the example scenario, user equipment device $510_3$, for example, can determine access point $504_2$ or cellular broadcast server $508_2$ offer a higher quality of experience and user equipment device $510_3$ can connect to one based on a network selection policy.

In another aspect, user equipment devices $510_1$-$510_5$ can continuously receive data indicating network statistics. As network performances change, user equipment devices $510_1$-$510_5$ can determine to connect to a disparate network based on real-time network statistics, in accordance with various aspects of the subject application.

Figure 6:
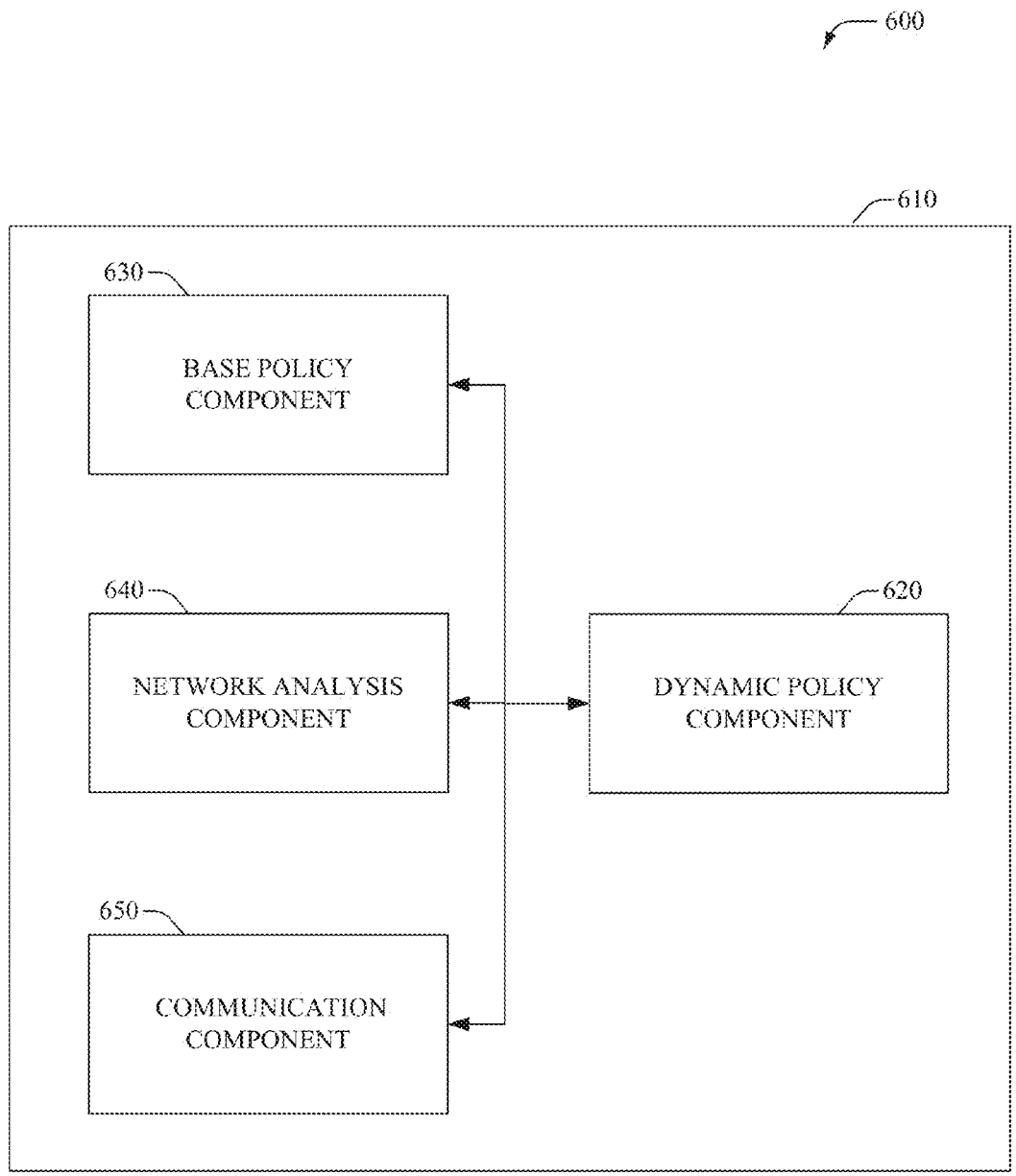
FIG. 6 illustrates an example system that that can generate dynamic and/or static network selection policies.

Turning to FIG. 6, illustrated is system 600 capable of determining a network selection policy for intelligent traffic steering based on real-time or near-real time network statistical data. System 600 can comprise an access network discovery and selection function server 610 can include functionality, as more fully described herein, for example, with regard to systems 100-400. Access network discovery and selection function server 610 can include functionality, as more fully described herein, for example, with regard to systems 100-400. Furthermore, access network discovery and selection function server 610 can comprise a number of components and a processor to execute the components. In one an embodiment, access network discovery and selection function server 610 comprises a dynamic policy component 620, a base policy component 630, a network analysis component 640, and a communication component 650.

Communication component 650 can communicate with components within a network via a communication framework (e.g., IP, S14 interface, cellular broadcast, wired connection, wireless connection, etc.). In an embodiment, access network discovery and selection function server 610 can utilize communication component 650 to transmit and/or receive data. In one example, communication component 650 can comprise transmitters, receivers, and/or other communication components.

Base policy component 630 can determine a policy based on user specific information, such as service agreements, device types, networks, location, and the like. As an example, base policy component 630 can create a policy for user equipment devices. In an embodiment, network analysis component 640 can determine network statistical information. In an aspect, network analysis component 640 can determine the information based on received data or through measurements of networks.

Dynamic policy component 620 can collect base policies and network statistical information to determine a dynamic network selection policy. Dynamic policy component 630 can utilize collected information to determine a network selection policy based on real-time or near real-time network statistical information. For example, a process for dynamically determining a traffic steering policy based on network statistics, simultaneously or near-simultaneously determining multiple traffic steering policies for disparate groups of user equipment devices and/or determining traffic steering policies as a function of real-time or near-real time network load data, etc., can be facilitated via an automatic network policy traffic steering system and process. Moreover, the automatic network policy traffic steering system can be employed to transmit policies to user equipment devices, one direct user equipment device connections to adjust network traffic, balance network load, optimize user quality of experience, etc.

As another example, system 600 can utilize classifiers to achieve functionality disclose herein. A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points/cellular broadcast servers, and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, an example embodiment can employ classifiers that are explicitly trained (e.g., via a generic training data) as well as implicitly trained (e.g., via observing user equipment device behavior, access point reports, operator preferences, historical information, receiving extrinsic information). For example, support vector machines can be configured via a learning or training phase within a classifier constructor and feature selection module. Thus, the classifier(s) can be used to automatically learn and perform a number of functions, including but not limited to determining according to a predetermined criteria a location of weak macro coverage (e.g., in real-time), interference problems, one or more macro access points that can best serve the location, adjustments to transmission and/or operating parameters (e.g., antenna bearing, tilt, phase, etc.) for tuning a macro antenna beam, estimated macro network coverage change based on implementation of the parameter adjustments, etc. The criteria can include, but is not limited to, historical patterns, user equipment device behavior, user preferences, service provider preferences and/or policies, access point parameters/reports, location of the access points, location of the macro sites, etc.

Figure 7:
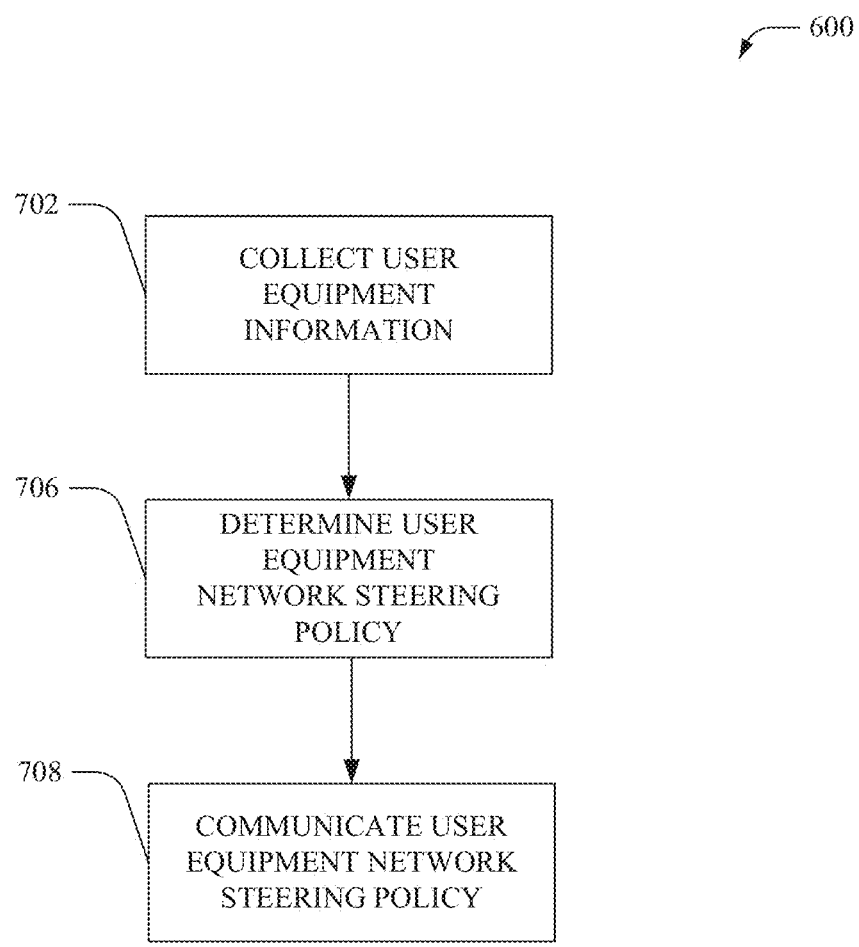
FIG. 7 illustrates an example methodology that can create a static network selection policy for a real-time network selection.
Figure 8:
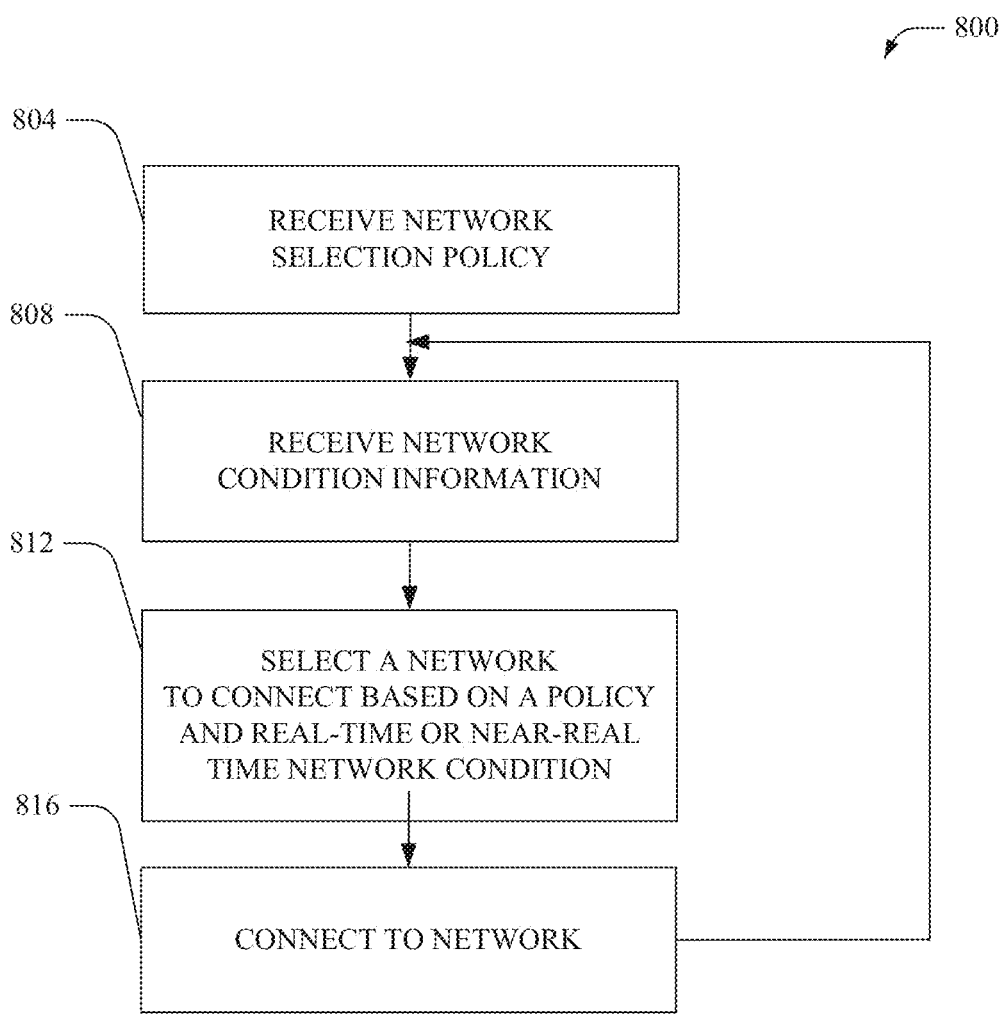
FIG. 8 illustrates an example methodology that can dynamically select a network for communication based on network conditions.
Figure 9:
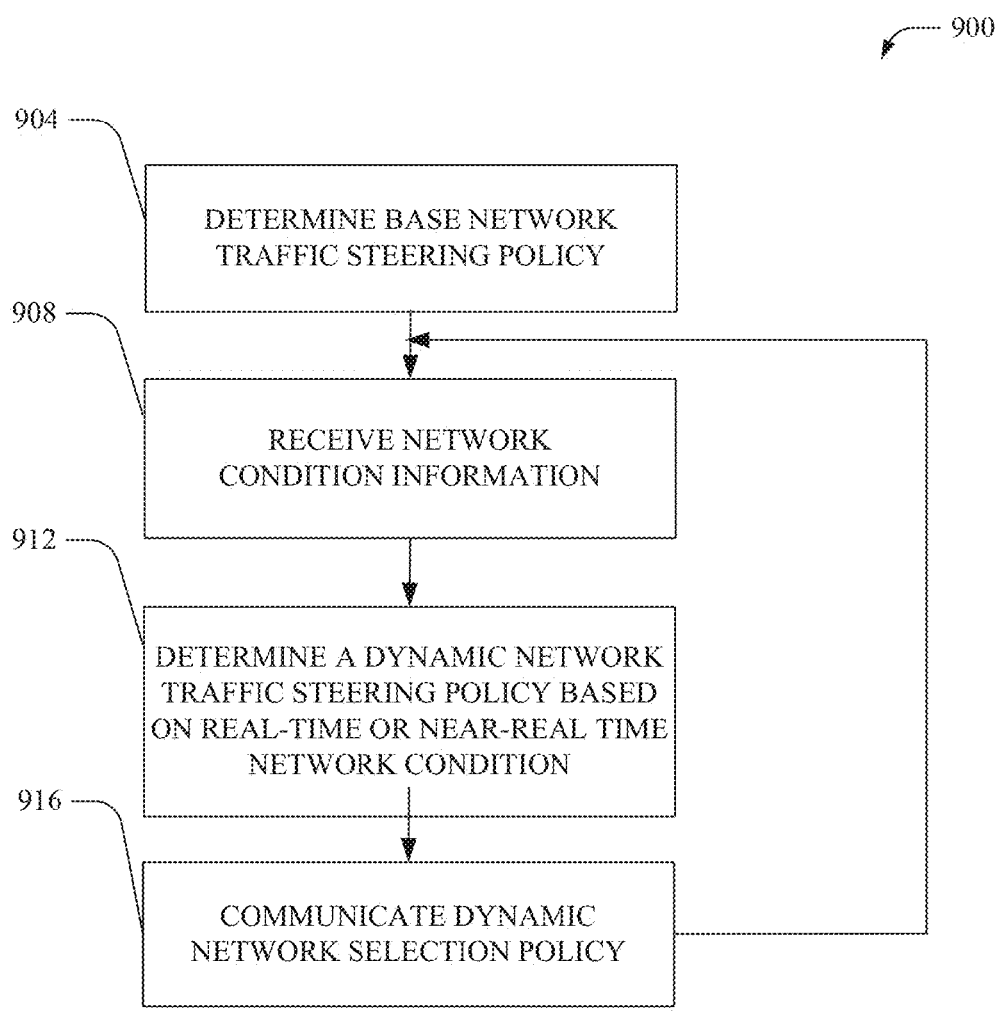
FIG. 9 illustrates an example methodology that can dynamically create a network selection policy for communication based on network conditions.

FIGS. 7-9 illustrate methodologies and/or flow diagrams in accordance with the disclosed subject matter. For simplicity of explanation, the methodologies are depicted and described as a series of acts. It is to be understood and noted that the subject specification is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and noted that the methodologies could alternatively be represented as a series of interrelated states via a state diagram or events. Additionally, it should be further noted that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 7, illustrated is an example methodology 700 that can be utilized to dynamically generate a network selection and/or traffic steering policy for user equipment device network selection based on real-time and/or near real-time network conditions. A large number of user equipment devices are being utilized in the cellular and other radio access networks as increasing amounts of users are introduced. User equipment devices are demanding increasing amounts of bandwidth from radio access networks. Additional radio access networks are available besides cellular or primary radio access networks. Steering user equipment devices based on radio access network conditions can enable dynamic and efficient user equipment device bandwidth utilization, decrease cost to service providers, and improve quality of experience perceived by the user equipment devices.

In one aspect, at 702, user equipment device related information is collected, for example, by a server (e.g., access network discovery and selection function server 106). In one example, user equipment device parameters such as, but not limited to, user defined rule(s), user equipment device type, user equipment device service level, and user equipment device location can be collected and interference issues (if any) can be detected. Additionally or optionally, a number of user equipment devices can be grouped according to collected user equipment device parameters.

At 706, a network steering policy can be determined (e.g., access network discovery and selection function server 106). The network steering policy provides instructions to direct user equipment device connections to networks based on network statistical information (e.g., network conditions, network load, etc.). In an example, one or more network steering policies can be created, simultaneously or otherwise, to dynamically steer user equipment devices based on current network conditions.

At 708, a user equipment device network steering policy can be communicated (e.g., by access network discovery and selection function server 106 to user equipment device 110). In one aspect, one or more policies can be transmitted to one or more user equipment device(s) based on user equipment device classifications. For example, user equipment devices can be classified and grouped according to device type, quality of service associated with a user agreement, and the like. Each user equipment device classification can receive a disparate network selection policy.

Referring now to FIG. 8, illustrated is an example methodology 800 that can be utilized to dynamically select a network to connect to based on real-time and/or near real-time network conditions. At 804, a network selection policy can be received (e.g., via user equipment device 410). It is noted that the network selection policy can comprise aspects and/or functionality as described with reference to systems 100-700.

At 808, network condition information can be received (e.g., via user equipment device 410). User equipment devices can received network condition information over any available and/or compatible communication framework (e.g., cellular, Wi-Fi, etc.). The information can be encoded when received and decoded by a user equipment device, for example. In various other implementations, information can be set as packets and can comprise indications of network statistics, such as load tokens, bandwidth utilization, etc. Additionally or alternatively, network condition information can be received via measurement components (e.g., network monitor component 440). It is noted that network statistical data can comprise predicted network conditions. For example, a user equipment device can monitor network conditions and predict conditions associated with a network based on location, date, time, etc.

At 812, a network to connect to based on the policy and the network conditions can be selected (e.g., by user equipment device 410). In one aspect, a network is selected by applying network conditions to the policy. Additionally or alternatively, a user equipment device can determine user defined rule(s) to be utilized in selecting a network.

At 816, a user equipment device can connect to a selected network (e.g., user equipment device $510_1$ connecting to radio access network $508_1$). In an aspect, connecting to a network can comprise disconnecting to a first network, and establishing a connection to a second network. Additionally or alternatively, methodology 800 can continue to 808 and receive updated network condition information indefinitely. It is noted that methodology 800 can halt at 816 based on user defined rules, user input, and/or a selection policy. For example, a user defined rule can comprise instructions to terminate receiving network condition information after a number of iterations, if network conditions have not altered past a threshold over a certain time period or number of iterations, if a user equipment device is in an idle mode (e.g., not in use), and the like.

Referring now to FIG. 9, illustrated is an example methodology 900 that can be utilized to generate a dynamic network selection and/or traffic steering policy for user equipment device network selection based on real-time and/or near real-time network conditions. At 904, a base network traffic steering policy can be determined. In an embodiment, a base network traffic steering policy can comprise instructions to connect to a network regardless of network conditions. In another aspect, 904 can comprise determining a number of base policies based on device types, quality of service agreements, and the like.

At 908, network condition information can be received in accordance with various aspects of this disclosure (e.g., by access network discovery and selection function server 610). Additionally or alternatively, receiving network condition information can comprise measure network parameters and determining network conditions based on the parameters.

At 912, a dynamic traffic steering policy based on network conditions can be determined (e.g., via access network discovery and selection function server 610). For example, a dynamic network selection policy can be determined based on real-time or near real-time network bandwidth utilization (e.g., load), network statistics, predicted network conditions, and the like.

At 916, a dynamic network selection policy can be communicated (e.g., sent by access network discovery and selection function server 610 and/or received by user equipment device 410). In accordance to various aspects of this disclosure, communication can be achieved via radio communication, wired and/or wireless communications, over appropriate radio access networks, and the like.

Additionally or alternatively, methodology 900 can continue to 908 to receive updated, relative to initially received information, network condition information. In various aspects, methodology 900 can iterate indefinitely. However, it is noted that methodology 900 can halt at 916 based on user defined rules, user input, selection policy, and the like.

Figure 10:
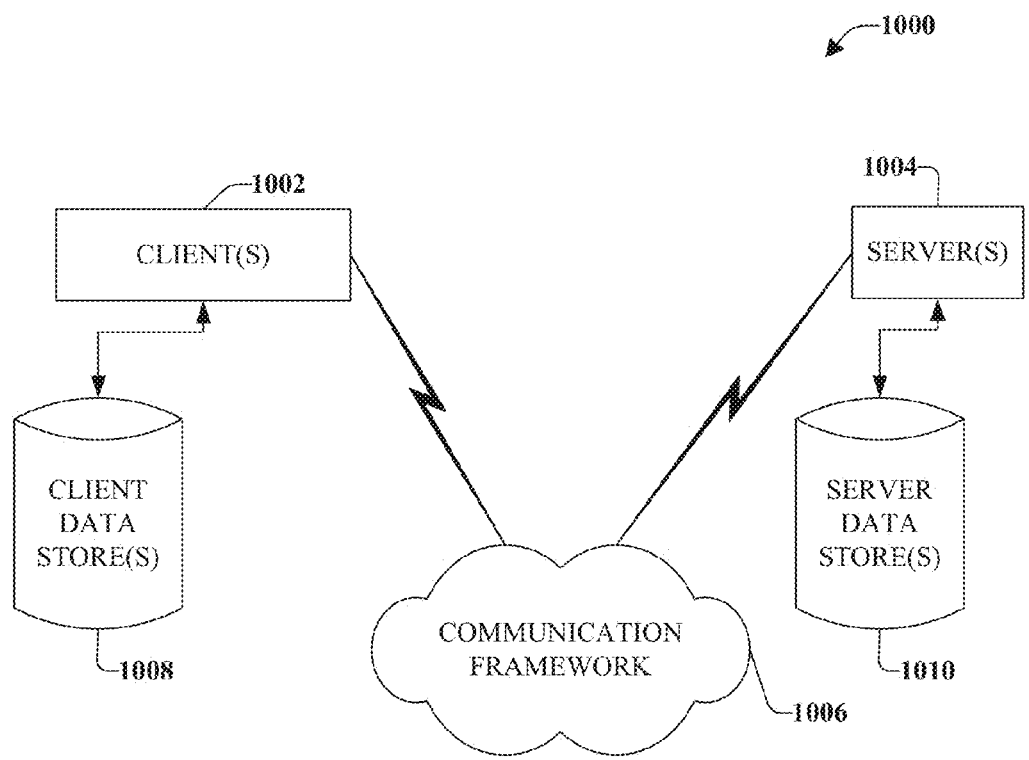
FIG. 10 illustrates an example schematic block diagram of a computing environment in accordance various aspects of this disclosure.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet adapted to be transmitted between two or more computer processes wherein data packets may include coded media items and/or aggregated media items. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one implementation, a server 1004 can transfer an encoded file, (e.g., network selection policy, network condition information, etc.), to client 1002. Client 1002 can store the file, decode the file, or transmit the file to another client 1002. It is noted, that a server 1004 can also transfer uncompressed file to a client 1002 and client 1002 can compress the file in accordance with the disclosed subject matter. Likewise, server 1004 can encode information and transmit the information via communication framework 1006 to one or more clients 1002.

Figure 11:
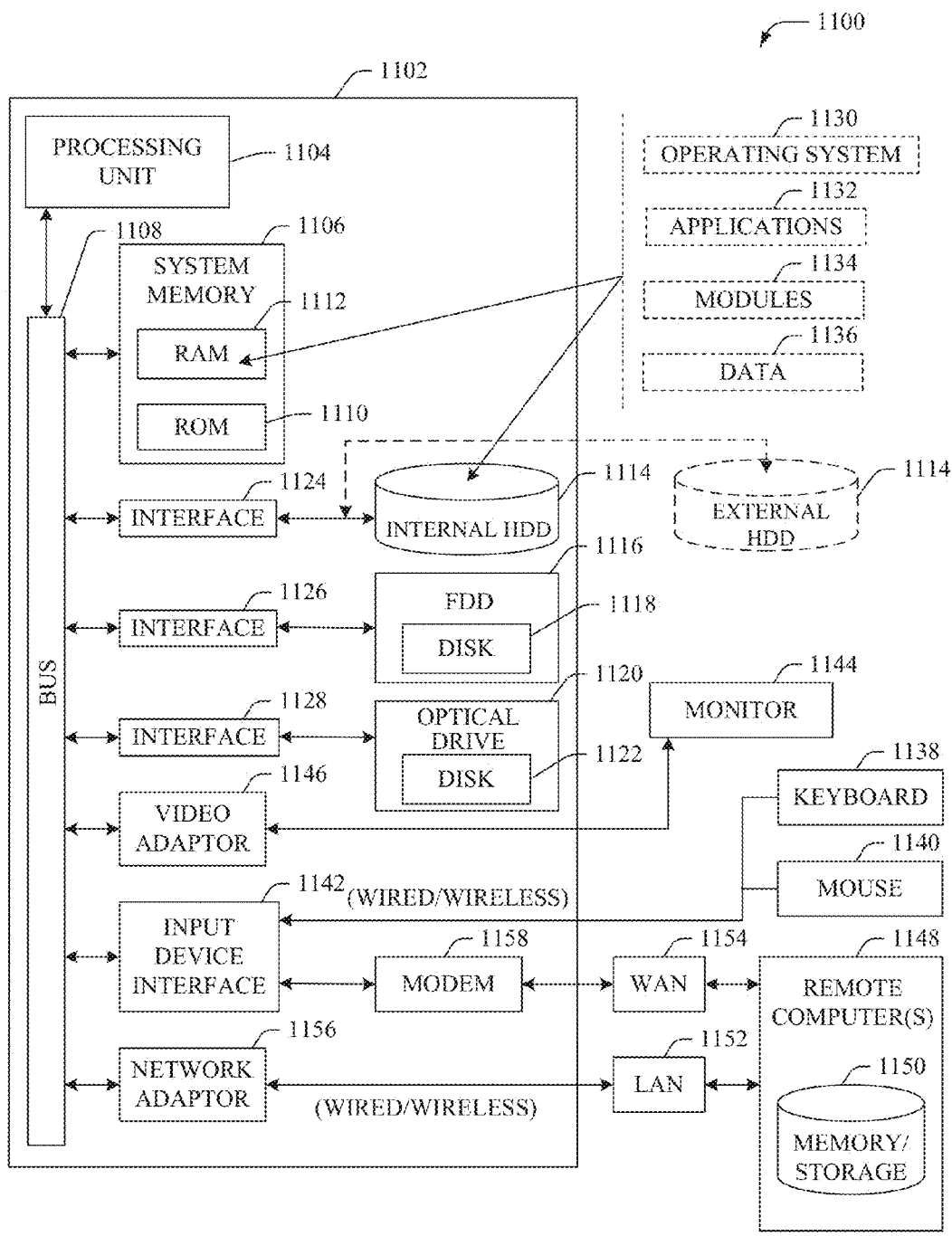
FIG. 11 illustrates a block diagram of a computer operable to execute the disclosed communication architecture.

Referring now to FIG. 11, there is illustrated a block diagram of a computer operable to execute the disclosed communication architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, it is noted that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments, including cloud-computing environments, where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically include (and/or facilitate the transmission of) computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system is stored in a non-volatile memory 1110 such as ROM, erasable programmable read only memory, electrically erasable programmable read only memory, which basic input/output system contains the basic routines that help to transfer information between elements within the computer 1102, such as during startup. The RAM 1112 can also include a high-speed RAM such as static RAM for caching data.

The computer 1102 further includes an internal hard disk drive 1114 (e.g., EIDE, SATA), which internal hard disk drive 1114 can also be configured for external use in a suitable chassis (not shown), a magnetic floppy disk drive 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network 1152 and/or larger networks, e.g., a wide area network 1154. Such local area network and wide area network networking environments are commonplace in offices and companies, and facilitate enterprise-wide computer networks, such as intranets, all of which can connect to a global communications network, e.g., the Internet.

When used in a local area network networking environment, the computer 1102 is connected to the local network 1152 through a wired and/or wireless communication network interface or adapter 1156. The adapter 1156 can facilitate wired or wireless communication to the local area network 1152, which can also include a wireless access point disposed thereon for communicating with the wireless adapter 1156.

When used in a wide area network environment, the computer 1102 can include a modem 1158, or is connected to a communications server on the wide area network 1154, or has other means for establishing communications over the wide area network 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It is noted that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. It is noted that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method, comprising:
determining, by a system comprising a processor, characteristic data representing network characteristics based on information relating to network devices of networks; and
transmitting, by the system, the characteristic data representing the network characteristics to a device in response to determining a performance parameter associated with an altered network of the networks has been altered past a threshold level, wherein the device is associated with a network selection policy of a set of network selection policies, the network selection policy comprising instructions for selection of a network device of a network of the networks for connection to the device as a function of the characteristic data.

2. The method of claim 1, further comprising:
generating, by the system, the network selection policy of the set of network selection policies as a function of data describing a device characteristic based on device information relating to the device.

3. The method of claim 2, further comprising:
determining, by the system, updated data comprising additional data describing an alteration to a parameter of the network selection policy based on determining that a defined event has occurred.

4. The method of claim 3, further comprising:
transmitting, by the system, the updated data to the device in response to the determining of the updated data.

5. The method of claim 1, further comprising:
selecting, by the system, the network selection policy for the device in response to determining that a defined event has occurred.

6. The method of claim 5, wherein the determining that the defined event has occurred comprises at least one of determining that the device has been activated within a coverage area of at least one of the network devices or determining a subscription agreement associated with the device has been altered.

7. The method of claim 5, further comprising:
transmitting, by the system, the network selection policy to the device, in response to the selecting of the network selection policy.

8. The method of claim 5, wherein the selecting the network selection policy for the device comprises:
selecting the network selection policy for the device based on at least one of a subscription agreement associated with the device, a device make associated with the device, or a location associated with the device.

9. The method of claim 1, further comprising:
determining, by the system, that the performance parameter has been altered past the threshold level based on determining that the altered network of the networks has transitioned between a condition defined as a congested network and another condition defined as a non-congested network.

10. The method of claim 1, further comprising:
altering, by the system, the network selection policy of the set of network selection policies based on statistical information relating to a history of performance metrics associated with the networks.

11. A system, comprising:
a processor; and
a memory that stores executable instructions that, when executed by the processor, facilitate performance of operations, comprising:
receiving a network selection policy of network selection policies, wherein the network selection policy comprises instructions for selection of a mobile network device of a mobile network for establishment of a connection;
altering the network selection policy based on a network selection policy parameter comprising a user defined rule associated with a user identity; and
selecting, as a function of the network selection policy, the mobile network device to which to establish the connection.

12. The system of claim 11, wherein the selecting the mobile network device comprises:
selecting the mobile network device as a function of network load conditions describing conditions of mobile network devices comprising the mobile network device.

13. The system of claim 11, wherein the operations further comprise:
receiving condition data representing a network load condition determined based on measurements associated with mobile network devices, comprising the mobile network device; and
selecting the mobile network device as a function of the network selection policy and the measurements associated with the mobile network devices.

14. The system of claim 11, wherein the operations further comprise:
receiving, in response to a defined event being determined to have occurred, an updated network selection policy of the network selection policies; and
replacing the network selection policy with the updated network selection policy.

15. The system of claim 11, wherein the operations further comprise:
receiving, in response to occurrence of a defined event, alteration information representing an alteration to be made to the network selection policy; and
performing the altering of the network selection policy further based on the alteration information.

16. The system of claim 11, wherein the receiving the network selection policy comprises receiving the network selection policy of the group of network selection policies based on data describing a device characteristic based on device information relating to a device.

17. The system of claim 11, wherein the receiving the network selection policy comprises receiving the network selection policy in response to a defined event being determined to have occurred.

18. A non-transitory machine-readable storage medium, comprising executable instructions that, when executed by a processor, facilitate performance of operations, comprising:
identifying a performance metric of a communication network based on measurements relating to a group of communication network devices of a group of communication networks;
transmitting the performance metric to a wireless device in response to determining a performance parameter associated with an altered communication network of the group of communication networks has been altered past a threshold level; and
controlling transitioning of the wireless device between communication network devices associated with different communication networks of the group of communication networks based on the performance metric and a communication network selection policy, selected from a group of communication network selection policies, that is associated with the wireless device.

19. The non-transitory machine-readable storage medium of claim 18, wherein the controlling the transitioning of the wireless device comprises:
controlling the transitioning of the wireless device between the communication network devices associated with the different communication networks based on at least one of a data processing speed metric associated with the different communication networks, a load metric associated with the different communication networks, or a power consumption metric associated with the different communication networks.

20. The non-transitory machine-readable storage medium of claim 18, wherein the operations further comprise:
based on determining a change in a location of the wireless device has occurred, altering the communication network selection policy.

* * * * *